June 9, 1964 J. J. ZIMMERMANN 3,136,856

REMOTE FUNCTION SELECTOR FOR AUTOMATIC TELEPHONE ANSWERING DEVICE

Filed Aug. 6, 1958

INVENTOR.
JOSEPH J. ZIMMERMANN

BY C. A. Bullbrandsen

ATTY

United States Patent Office 3,136,856

Patented June 9, 1964

3,136,856

REMOTE FUNCTION SELECTOR FOR AUTOMATIC TELEPHONE ANSWERING DEVICE

Joseph J. Zimmermann, Milwaukee, Wis., assignor, by mesne assignments, to Automatic Electric Laboratories, Inc., Northlake, Ill., a corporation of Delaware Filed Aug. 6, 1958, Ser. No. 753,457
8 Claims. (Cl. 179—6)

The present invention pertains to automatic telephone answering apparatus and particularly to a remote function selector for controlling a playback mechanism by impressing a tone of predetermined frequency and duration on an answering device from a remote substation.

In the past, the remote playback function was not controlled from the substation but could only be actuated thereby. After actuation of the playback function, the control of operation rested only with the mechanism and the rewind would go all the way to the beginning and play the complete record or wire without means for termination.

It is a primary object of the present invention to provide an automatic telephone answering apparatus with a remote function selector wherein operation of the device is completely controlled from the substation.

Another object of the present invention is to control a function selector in telephone answering apparatus by means of a tone of predetermined frequency and predetermined duration impressed upon the telephone line from a remote substation.

Another object of the present invention is to provide a means for assuming control of telephone answering apparatus from a remote station during any portion of the answer cycle.

Still another object of the present invention is to provide means in telephone answering apparatus for automatically returning the apparatus to standby condition upon the calling party "hanging up" and breaking the telephone circuit.

Still another object of the present invention is to provide telephone answering apparatus with means controlled from a remote substation to incrementally reverse the message containing media whereby the calling party can select incremental portions of the messages to receive or repeat.

These and other objects of the present invention will be apparent to one skilled in the art from a reading of the following detailed description in conjunction with the drawings wherein.

Figure 1:
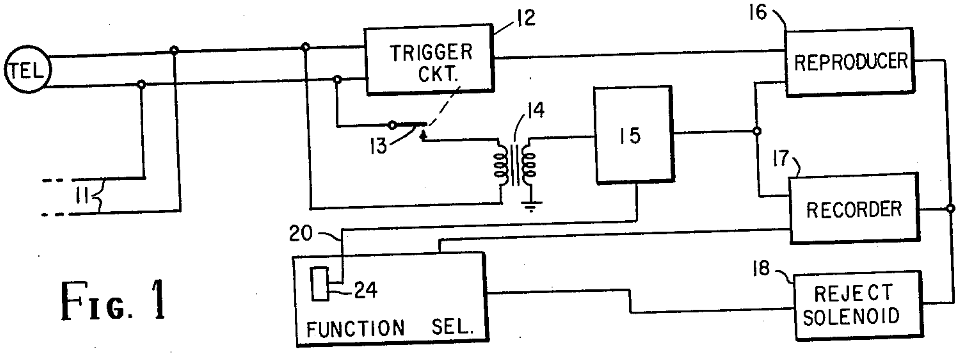
FIG. 1 is a diagrammatic representation of a telephone answering device.
Figure 2:
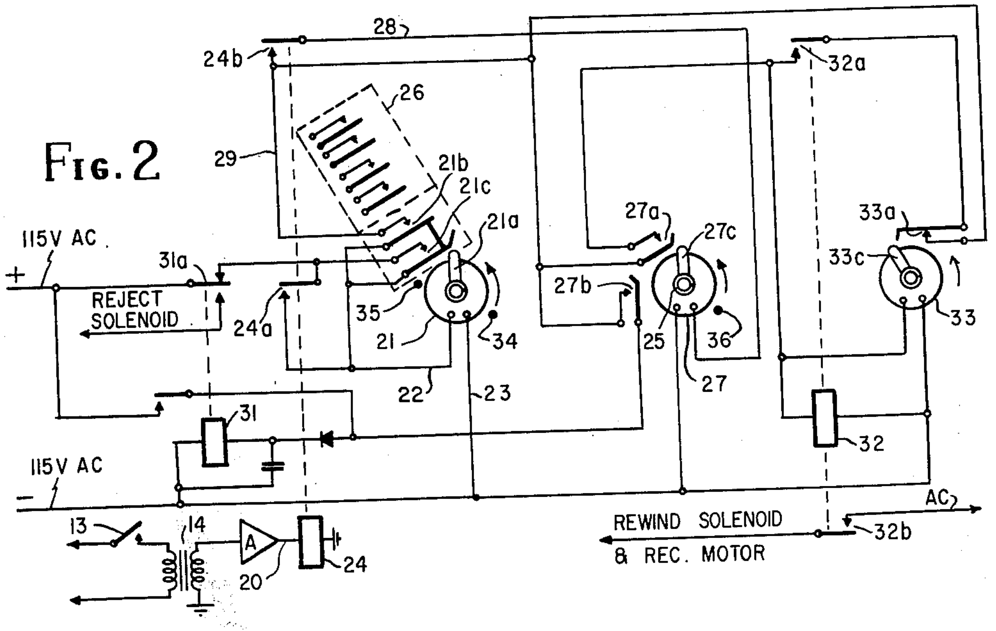
FIG. 2 is a schematic circuit diagram illustrating the function selector of this invention in combination with a telephone answering mechanism.

The telephone answering device which is diagrammatically illustrated in FIG. 1 is, with the exception of the remote function selector, of the type described in applicant's copending United States applications, Serial No. 361,593, filed June 15, 1953 (now U.S. Patent No. 2,848,541) and Serial No. 600,002, filed July 25, 1956 (now U.S. Patent No. 3,067,289).

Referring now to FIG. 1, the usual answering device is actuated by a ringing current in a telephone line 11 through a trigger circuit 12. The trigger circuit 12 includes a capacitor or other suitable device which blocks the normal direct current in the line, but which allows the alternating current of a ringing signal to actuate the circuit to close a contact 13 and connect a transformer 14 across the telephone line to simulate the conditions of answering the telephone. The trigger circuit 12 also actuates a reproducer 16 to initiate the transmission of a prerecorded message through suitable amplifiers indicated at 15 and the transformer 14 out over the telephone line 11 to the calling party. The message is of the conventional type which gives instructions or information to the calling party and terminates in a tone signal or other indicia to actuate a wire recorder in the recording unit 17. With the wire recorder 17 operating, the calling party delivers his message over the telephone line, and it is impressed on the wire of the wire recorder for subsequent transmission or playback to the called subscriber. At the end of a predetermined increment of time, the recorder 17 is disconnected and the reproducer is reset in standby condition to answer subsequent calls at which time the above described answering cycle is repeated.

If, for any reason, the transmission and recording cycle is not completed, the control circuit actuates a reject solenoid, indicated generally at 18, to disconnect the device so as not to interfere with the telephone line or to cause further damage to the mechanism by faulty operation.

The playback function of the answering device is normally accomplished by rewinding the wire recorder to the beginning and then playing it back with the aid of a control device which is either built into the recorder or which is attached thereto for playback functions. The components of the answering apparatus such as the trigger circuit, the reproducer, and the recorder are well known in the art and are completely described in the above mentioned applications along with the control circuits interconnecting them.

The remote function selector, which is the primary subject of this application, is connected to the telephone answering mechanism for operation by receipt of a tone of predetermined frequency and duration to actuate the rewind motor of the recorder to afford the subscriber an incremental playback which may be controlled from a remote substation.

The remote function selector comprises a first timing means, a second timing means conditioned by the first timing means for operation in response to a tone of predetermined frequency, means for actuating a function selector, means for timing the operation of the function, a reject circuit operated by said second timing means, and reset means operated by the function timing means for returning the answering apparatus to a standby condition after operation of the function. Through use of the above-mentioned timing circuits, the control of the answering mechanism from the remote substation is dependent upon a combination of a tone of predetermined frequency transmitted for a predetermined duration to the device from the remote substation.

The first timing means includes a motor 21 connected in a series with a suitable power supply through a conductor 22 having a normally open contact 24*a* therein adapted to be closed by a tone actuated relay 24 to complete an operating circuit to the motor 21 so long as the relay 24 is actuated. A bank of contacts indicated generally at 26 is positioned for operation by the pawl 21*a* on the motor 21, after a predetermined period of energization thereof, to establish operating circuits for the rewind function of the answering mechanism.

The second timing means includes a motor 27 connected in series with a suitable power supply by a circuit, including the conductors 28, 29 and 22, which is conditioned by the closing of a make contact 21*b* by the motor 21 and is actuated by the closing of a make contact 24*b* on the tone actuated relay 24 to energize the motor 27. The motor 27 motivates a pawl 27*c* through a predetermined locus and has associated therewith two make contacts 27*a* and 27*b* each of which is adapted to be closed by the pawl 27*c* at a different predetermined interval of operation of the motor 27.

The reject circuit is adapted to be actuated by the closing of the contact 27*b* by the motor driving pawl 27*c* and includes a relay 31 operable to move a transfer armature contact 31*a* from the operating circuits for the function selector to the operating circuit for a reject solenoid (not shown).

The function selector and means for timing its operation include a relay 32 having two make contacts 32*a* and 32*b* associated therewith and a circuit actuated by the closing of the make contact 27*a* by the motor driven pawl 27*c* for simultaneously energizing the relay 32 and starting the timing motor 33 to control the period of operation—the timing motor 33 having associated therewith a break contact 33*a* which is opened after a predetermined length of operation of the timing motor 33 to interrupt the energizing circuit for the relay 32.

Figure 3:
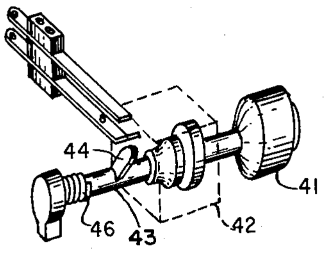
FIG. 3 is an enlarged perspective illustrating an example of a motor means operable to operate the contacts in the system.

The homing type timing devices utilized in this invention are motor driven switches, an example of which is shown in detail in FIG. 3, which comprises a synchronous motor 41 connected through a gear reduction box 42 to a drive shaft 43 having a cam arm or pawl 44 connected thereto. A coil spring 46 is secured to the shaft and to the motor housing to oppose the rotation of the drive shaft by the motor and to return the shaft and pawl to a home position upon cessation of current to the motor. The gear reduction box 42 includes suitable means such as a friction clutch for maintaining sufficient torque on the shaft 43 to hold the pawl 44 in an operated position against a stop for as long as current is applied to the motor. Through selection of gearing and the placing of contacts relative to the travel of the pawl 44, the time lapse between initial operation of the motor and operation of the switch by the pawl can be very closely governed, and since the motivation is against the spring 44, any break in the current to the motor returns the pawl to its home position, thereby requiring an uninterrupted period of energization to move the pawl to its operating position.

In operation, the relay 24 is actuated by a predetermined tone from the line 11 through the transformer 14 to close the make contacts 24*a* and 24*b*. The closing of the contact 24*a* completes an operating circuit for the motor 21, from one side of the power circuit through the conductor 22 to the other side of the power circuit. As long as the relay 24 is operated, the motor 21 operates to advance the pawl 21*a* toward the contacts 21*b* and 21*c* of the bank 26. The gearing of the motor 21 is such that the pawl 21*a* advances from its home position to a position against a limit pin 35 after a predetermined period of continuous operation. Interruption of the operating circuit for any reason, such as the discontinuance of the tone to the relay 24, releases the motor, and the pawl 21*a* is returned to its home position against pin 34 by its associated coil spring. After the relay 24 has been energized for a continuous predetermined period—in the present example, six seconds—the pawl 21*a* will have moved up to simultaneously close the two associated contacts 21*b* and 21*c*. Closing of the contact 21*c* shunts the contact 24*a* on the relay 24 and completes a locking circuit for the motor 21, and the closing of the contact 21*b* conditions an operating circuit for the motor 27 for operation upon the subsequent reoperation of relay 24 and the reclosing of the contact 24*b*.

The motor 27 is so timed in its operation that the pawl 27*c* will advance from a starting pin 36 to close the contact 27*a* in a predetermined period of time—for example, three consecutive seconds. It will be seen, therefore, that after the relay 24 has been operated for six consecutive seconds so that the motor 21 advances pawl 21*a* to hold the contacts 21*b* and 21*c* closed, the subsequent closure of the contact 24*b* by a second operation of the relay 24, completes an operating circuit to the motor 27. A second continuous tone signal of the selected predetermined frequency, when applied to the relay 24 for a period of three seconds, results in motor 27 advancing pawl 27*c* from its starting pin 36 to close the contact 27*a* to establish a parallel operating circuit for the relay 32 and the motor 33. Upon cessation of the tone, the relay 24 releases and opens the operating circuit for the motor 27 at its contacts 24*b*, and the pawl 27*c* is returned to its home position against the pin 36. Operation of the relay 32 closes the contacts 32*a* and 32*b*. The closure of the contact 32*a* completes a circuit for shunting contact 27*a* to maintain the operation of the motor 33 and the relay 32, and the closure of the contact 32*b* completes an operating circuit to the rewind solenoid and the motor of the recorder which will continue to rewind the tape or wire in the recorder so long as the contact 32*b* is closed.

The motor 33 is geared to rotate the pawl 33*c* one complete revolution in a predetermined length of time which will be representative of the incremental rewind of the recorder. In this example, the pawl 33*c* makes one complete revolution in twelve seconds to rewind the recorder for one minute of playback. Upon having completed one revolution, pawl 33*c* strikes the break contact 33*a* to open the operating circuit to the relay 32 and the motor 33. Relay 32 then releases and pawl 33*c* stops clear of contacts 33*a*. A subsequent three second burst of tone of the predetermined frequency repeats the above-mentioned control cycle to rewind a second increment of tape corresponding to another minute of messages to be played back from the recorder.

When the subscriber, following the playback wishes to place the answering device back in the standby or original condition, he impresses a tone upon the line which actuates the relay 24 for a period of time longer than three seconds required to actuate the incremental rewind—for example 5 seconds—to move the pawl 27*c* on the motor 27 into camming engagement with the make contact 27*b*, thereby energizing the relay 31 to close the make contact at armature 31*a* to energize a reject solenoid, such as shown in applicant's co-pending United States application Serial No. 350,169, filed April 21, 1953 (now U.S. Patent No. 2,927,964), to reset the answering apparatus to its standby position.

While the present invention has been described in a particular embodiment, it is of course understood that various changes may be made in the structure without departing from the spirit and scope of this invention.

What is claimed is:

1. In telephone answering apparatus including a recorder and a reproducer, means for controlling an incremental playback function from a remote substation, comprising: means responsive to a tone of predetermined frequency for energizing a first motor means; means responsive to a predetermined period of continuous energization of said first motor means to establish a circuit to a second motor means; means responsive to a tone of predetermined frequency to energize said second motor means through said established circuit; means for reversing the recording mechanism in said answering device; delay means operable for a predetermined time after its actuation for rendering said reversing means ineffective; and circuit means actuated by a predetermined period of continuous operation of said second motor means for simultaneously energizing said reversing means and said delay means, whereby a first tone of predetermined duration conditions said playback function for operation and a second tone of a second predetermined duration actuates said playback function.

2. In telephone answering apparatus coupled to a telephone line and having a normal answering cycle initiated by a ringing current in the telephone lines during which a reproducing means and a recording means are sequentially actuated each for a predetermined period of time to transmit a prerecorded message to the telephone line and record a message from the telephone line and the apparatus is returned to a stand-by condition, a remote function selector comprising: means actuated by a single tone of a predetermined frequency and a first predetermined length for interrupting the normal answer cycle; means actuated by said single tone of said predetermined frequency and a second predetermined length for actuating a predetermined function; and means actuated by said single tone of said predetermined frequency and a third predetermined length for returning said answering apparatus to its normal stand-by position.

3. In telephone answering apparatus coupled to a telephone line and having a normal answering cycle initiated by a ringing current in the telephone line during which a reproducing means and a recording means are sequentially actuated each for a predetermined period of time to transmit a prerecorded message to the telephone line and record a message from the telephone line after which the apparatus is returned to a stand-by condition, a remote function selector comprising: means actuated by a tone of predetermined frequency and a first predetermined length for interrupting the normal answering cycle; means actuated by a subsequent tone of said predetermined frequency and a second predetermined length for initiating a playback cycle of predetermined length; means actuated by repeated bursts of tone of said second predetermined length for increasing the length of said playback cycle by equal increments; and means actuated by a tone of said predetermined frequency and a third predetermined length for returning said answering apparatus to its normal stand-by position.

4. In telephone answering apparatus coupled to a telephone line and having a normal answering cycle initiated by a ringing current in the telephone line during which a reproducing means and a recording means are sequentially actuated each for a predetermined period of time to transmit a prerecorded message to the telephone line and record a message from the telephone line; a remote function selector, comprising: first timing means; second timing means; an operating circuit for said second timing means; means actuated by operation of said first timing means for a predetermined period of time to condition said operating circuit for said second timing means; means actuated by a special tone signal received over said telephone line during said answering cycle for operating said first timing means for said predetermined period; means actuated by operation of said second timing means for a predetermined period for operating a function actuating means; and means for actuation of the operating circuit for said second timing means for its predetermined period responsive to a subsequent special tone signal received over said line.

5. In telephone answering apparatus as in claim 4, third timing means, means responsive to the operation of said third timing means for a predetermined period for releasing said function actuating means, and means for operating said third timing means for its predetermined period responsive to said operation of said second timing means.

6. Telephone answering apparatus as in claim 4 wherein said predetermined periods of said first and second timing means are of different lengths, and require continuous tone signals of corresponding lengths for their useful operation.

7. In telephone answering apparatus as in claim 4, a normal starting position for each of said first and second timing means, means for moving said several timing means each away from its starting position means for restoring said timing means to said start positions, and means for rendering said restoring means effective whenever said tone signals are of less duration than said predetermined time periods.

8. In a telephone answering apparatus coupled to a telephone line and having a normal answering cycle initiated by a ringing current in the telephone line during which a reproducing means and a recording means are sequentially actuated each for a predetermined period of time to transmit a pre-recorded message to the telephone line and record a message from the telephone line, a remote function selector, comprising: tone responsive relay means operated by a single tone of predetermined frequency for a particular predetermined first period of time in said telephone line to interrupt said normal answering cycle; first motor means operable as a first timing device; a normally incomplete first circuit means for controlling said first motor means; means operated by said tone responsive relay means for completing said first circuit means to operate said first motor means; second motor means operable as a second timing device; a normally incomplete second circuit means for controlling said second motor means; means operated by said first motor means for preparing said second circuit means; said tone responsive relay means reoperated by said single tone of said predetermined frequency for a different predetermined second period of time in said telephone line; means operated in response to said reoperation of said tone responsive relay means for completing said prepared second circuit means to operate said second motor means; and means operated in response to said operation of said second motor means for initiating a predetermined function of said answering apparatus.

References Cited in the file of this patent

UNITED STATES PATENTS

| | | |
|---|---|---|
| 2,773,123 | Handschin | Dec. 4, 1956 |
| 2,784,254 | Lane | Mar. 5, 1957 |
| 2,800,530 | Van Deventer | July 23, 1957 |